Patented Aug. 7, 1934

1,968,991

UNITED STATES PATENT OFFICE 1,968,991

MANUFACTURE OF TRANSPARENT SHEETS OR COATINGS

Forest H. Clickner, Chicago, Ill., assignor to Kraft-Phenix Cheese Corporation, Chicago, Ill., a corporation of Delaware No Drawing. Application January 30, 1933, Serial No. 654,256

8 Claims. (Cl. 91—68)

The invention relates to improvements in the manufacture of transparent sheets or coatings, and has particular reference to sheets of thin, flexible, moisture-proof material which may be employed as wrappers for merchandise.

The principal object of the invention is to produce a sheet of the character described, which will be moisture-proof and air-proof and which may be advantageously employed in the packaging of edible articles or materials, as well as materials which are not of an alimentary character.

In producing the improved material, casein is employed as the principal base or ingredient. This basic ingredient may be prepared in any usual manner from milk such as by the rennet precipitation method and is converted to solid form by any suitable drying process or apparatus.

The solid casein is then ground up in a suitable mill into fine powder, preferably of eighty mesh or even finer. This powdered casein is then dissolved in an aqueous bath containing an alkali such as sodium hydroxide or ammonium hydroxide. I have found that crude or commercial casein, as usually prepared by low cost commercial methods contains, in addition to dirt particles, certain inherent impurities in the form of mineral native salts, especially salts of calcium resulting from the treatment of the milk and the precipitation of the casein, e. g. lactates, citrates, chlorides or phosphates. Because of the character of casein itself, it is not practical, in its commercial manufacture to make a complete elimination of such impurities.

I have also discovered that when this crude casein is dissolved in an alkali solution such as I have described, these impurities may be made to go into the solution if the solution is sufficiently dilute, but such a solution is not commercially usable for making transparent coating of the class described because the viscosity of the solution is too low to produce a proper coating. Also, with such a dilute solution, so much solvent must be removed that the product is prohibitive in cost.

On the other hand, if the concentration of the solution is made high enough to produce a commercially feasible coating, these impurities which are insoluble in such a solution of the desired concentration, carry through as impurities in the coating and I have discovered that they are responsible for pin points or interruptions in the continuity of the sheet, and result in brittleness and other undesirable characteristics which make the article unsalable for most purposes.

I have also discovered that, even if a very dilute solution be employed, these salts in the final sheet, in due course, say in two weeks time, tend to migrate and form large crystals which cause an apparently perfect sheet to become brittle and to develope pin-holes. I have found it impractical to remove these unwanted salts by chemical methods. The filtration method which I have developed for the purpose of effecting said removal, appears to be novel. The important features of this new method, as applied to casein, are—

1. The concentration of casein should be sufficiently high so that these salts are insoluble in the solution. A concentration of about 15% casein is ordinarily sufficient.

2. The viscosity must be relatively high, much higher than ordinarily would be considered feasible for filtration by the usual methods. For a 15% concentration, the consistency should measure about the same as glycerine. This viscosity is preferably regulated by the addition of alkali. When the viscosity is right the pH will be found to have a value of about 7.2.

3. The filtration should be effected through a cloth having a sufficient closeness of weave to prevent passage of the foreign particles, whether dirt or salt crystals under the imposed conditions. I have had good results when using a woven wire screen supporting a filter cloth made of fine, closely woven, canvas duck.

4. A sufficiently heavy filtering pressure should be employed, preferably with the help of a filter aid, such as kieselguhr, to hold the foreign particules on the surface of the filter cloth, the pressure, however, also serving to force the colloidal material through the pores of the cloth. A pressure of about 50 to 90 pounds per square inch will give good results.

It is a peculiarity of this filtering process that practically none of this colloidal liquid will pass through the filter until there is reached a certain pressure which may be termed critical to suit the particular conditions. However, when this critical pressure is attained, the flow proceeds with comparatively rapidity, at a lower pressure.

The filtration or in fact all handling of the solutions until the final stage, is effected at a temperature of about 160° F., which temperature is maintained in order to prevent deterioration due to fermentation.

To the filtered solution there is added a plasticizer or plasticizers. Of such plasticizers, I prefer glycerine and sulphonated castor oil (low in salt). The amount of plasticizer used should be not more than 20% of glycerine based upon the weight of the finished sheet, and not more than 5% of sulphonated oil on the same basis.

By the use of any suitable coating method or apparatus, a coating of the solution is applied to a conveyor belt having a smooth surface, for example, oil cloth or like flexible material may be employed. Preferably, the belt is given a continuous movement so that the process may be carried on continuously.

After the belt has been coated with the casein solution, it is directed into a bath of setting or hardening agent, or the setting or hardening agent may be applied by a spray or in any other suitable manner. The setting agent preferably consists of an aqueous solution of one of the groups of materials which comprise formaldehyde, hexamethylene-tetramine, tri-oxy-methylene, other aldehydes, chromium salts, tannic acid, acetone, etc. However, I have had best results with formaldehyde using a 40% solution.

It is also possible to add the formaldehyde to the casein solution before the coating is cast, it being understood that in such a case, the solution carrying the formaldehyde must be used up promptly after the addition of the formaldehyde.

After the coating has been set or hardened, the further movement of the sheet causes a final drying of the coating, which may be accelerated by the application of heat or hot air. When the coating has been thoroughly dried, it may be separated from the belt without any special difficulty. The material is very flexible, quite transparent, air-proof, moisture-proof and free from any objectionable taste or odor which would make it unsuitable for the packaging of food products.

An important phase of my invention is that the formaldehyde used is less than that required to effect the proper chemical combination with the casein and the coating. In other words, there is an excess of casein which serves to dissolve the chemically combined material and thus prevent cloudiness which always occurs if too much formaldehyde is used.

A sheet prepared in the described manner with a deficiency of formaldehyde is not absolutely water-proof, but is sufficiently moisture-proof for all commercial purposes for which transparent coatings or sheets are usually employed. In this respect, it compares quite favorably with transparent wrapping sheets of other types which are now on the market. Obviously, if greater resistance to moisture penetration is desired, there may be applied to the surface of the sheet a thin coating of moisture-proof material, such as a cellulose lacquer.

This material can be made much more cheaply than the materials of a competitive character which are now on the market, and of like grade and efficiency. It may be colored with edible dyes in a wide range of colors.

Obviously the process may be employed in the coating of foil or sheets made of other materials. Foil to be coated according to my invention, may be printed in advance with any ink which is merely water-proof.

I claim as my invention:

1. The herein described flexible, transparent film or sheet capable of retaining its flexibility and transparency for a sufficient length of time to satisfy all ordinary commercial purposes, containing as its major ingredient casein combined with a suitable plasticizer and a suitable setting agent, there being sufficient excess of casein to prevent cloudiness of the material, the latter being substantially free from native mineral salts which, if present in the product, would cause the development of pin-holes or brittleness.

2. The herein described flexible, transparent film or sheet capable of retaining its flexibility and transparency for a sufficient length of time to satisfy all ordinary commercial purposes, containing as its major ingredient casein combined with a suitable plasticizer and a suitable setting agent, there being sufficient excess of casein to prevent cloudiness of the material, the latter being substantially free from calcium salts normally native to commercial casein which, if present in the product, would cause the development of pin-holes or brittleness.

3. The herein described flexible transparent film or sheet capable of retaining its flexibility and transparency for a sufficient length of time to satisfy all ordinary commercial purposes, containing as its major ingredient casein combined with a suitable plasticizer and a suitable setting agent, there being sufficient excess of casein to prevent cloudiness of the material, the latter being substantially free from native mineral salts which, if present in the product, would cause the development of pin-holes or brittleness, said material being free from fermentation products which, if present, would cause the material to give off an objectionable odor.

4. The herein described flexible, transparent, odorles film or sheet capable of retaining its flexibility and transparency for a sufficient length of time to satisfy all ordinary commercial purposes, containing as its major ingredient casein combined with a suitable plasticizer and a suitable setting agent, there being sufficient excess of casein to prevent cloudiness of the material, the latter being substantially free from calcium salts normally native to commercial casein, which, if present in the product, would cause the development of pin-holes or brittleness, the material being free from fermentation products which, if present, would cause the material to give off an objectionable odor.

5. The herein described improvement in the art of producing a flexible, transparent, odorless film, which will retain its flexibility and transparency for a sufficient length of time to satisfy all ordinary commercial purposes, which consists in preparing an aqueous solution containing as its major ingredient casein substantially free from native calcium salts which, if present in the finished film, would cause the development of pin-holes or brittleness, coating a base with said solution in conjunction with a suitable plasticizer and setting agent, the casein being present in sufficient amount as compared with the setting agent to prevent cloudiness, while maintaining the solution at a temperature sufficiently high to prevent fermentation of the casein with consequent development of an objectionable odor, and then drying said coating.

6. In the art of producing a flexible, transparent film which will retain its flexibility and transparency for a sufficient length of time to satisfy all ordinary commercial purposes, the steps which consist in forming an aqueous solution of commercial casein, the ratio of the casein to solvent being sufficiently high to prevent the undesirable mineral salts present in the casein from entering the solution, and then filtering out said salts.

7. The herein described improvement in the art of preparing a solution of casein for use in producing transparent films, which consists in forming an aqueous solution of commercial casein which contains undesirable mineral salts as impurities, the ratio of casein to solvent being about 15 per cent to prevent said salts from entering the solution and then filtering out said salts by use of pressure of the order of about 50 lbs. per square inch.

8. The improvement in the art of preparing a solution of casein for use in producing transparent films, which consist in forming an aqueous, alkaline solution of commercial casein which contains undesirable mineral salts as impurities, said solution having a pH value of about 7.2, the ratio of casein to solvent being about 15 per cent to prevent said salts from entering the solution, and then filtering out said salts by use of pressure of the order of about 50 lbs. per square inch.

FOREST H. CLICKNER.